United States Patent
Anai et al.

(10) Patent No.: US 12,012,523 B2
(45) Date of Patent: Jun. 18, 2024

(54) CONDUCTIVE FILM FORMATION COMPOSITION AND METHOD FOR MANUFACTURING CONDUCTIVE FILM

(71) Applicant: MITSUI MINING & SMELTING CO., LTD., Tokyo (JP)

(72) Inventors: Kei Anai, Saitama (JP); Shun Fukuzato, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 932 days.

(21) Appl. No.: 16/971,586

(22) PCT Filed: Mar. 26, 2019

(86) PCT No.: PCT/JP2019/012986
§ 371 (c)(1),
(2) Date: Aug. 20, 2020

(87) PCT Pub. No.: WO2019/189251
PCT Pub. Date: Oct. 3, 2019

(65) Prior Publication Data
US 2020/0385587 A1    Dec. 10, 2020

(30) Foreign Application Priority Data

Mar. 28, 2018   (JP) ................ 2018-061596

(51) Int. Cl.
*C09D 5/24*      (2006.01)
*C09D 7/40*      (2018.01)
(Continued)

(52) U.S. Cl.
CPC ............. *C09D 5/24* (2013.01); *C09D 7/67* (2018.01); *C09D 7/68* (2018.01); *C09D 7/70* (2018.01);
(Continued)

(58) Field of Classification Search
CPC .............. C09D 5/24; C09D 7/67; C09D 7/68; C09D 7/70; C09D 177/00; C09D 7/62;
(Continued)

(56) References Cited

U.S. PATENT DOCUMENTS

2015/0030784 A1   1/2015   Kawato et al.
2016/0290036 A1*  10/2016  Nukui ............... B32B 27/20
(Continued)

FOREIGN PATENT DOCUMENTS

CN   104303243   1/2015
EP   2 871 644   5/2015
(Continued)

OTHER PUBLICATIONS

International Search Report for PCT/JP2019/012986 dated Jun. 11, 2019, 4 pages, with English Translation.
(Continued)

*Primary Examiner* — Alexander M Weddle
(74) *Attorney, Agent, or Firm* — NIXON & VANDERHYE

(57) ABSTRACT

A composition for forming a conductive film contains flat metal particles and a resin. The flat metal particles each have a metal oxide layer in the surface portion thereof. The flat metal particles have a ratio of the thickness of the metal oxide layer to the thickness of the flat metal particle of from 0.010 to 0.300. The thickness of the metal oxide layer is from 0.010 μm to 2.000 μm. In the method for manufacturing a conductive film, a composition for forming a conductive film is used, the composition containing flat metal particles and a resin. The composition for forming a conductive film is applied to a base material to form a coating film, and then the coating film is irradiated with light to
(Continued)

sinter the coating film, thereby obtaining a conductive film. The flat metal particles each have a metal oxide layer in the surface portion thereof.

14 Claims, 1 Drawing Sheet

(51) Int. Cl.
*C09D 177/00* (2006.01)
*H01B 1/22* (2006.01)
*H01B 5/14* (2006.01)
*H01B 13/00* (2006.01)
*B05D 3/06* (2006.01)
*C08K 3/08* (2006.01)
*C08K 7/18* (2006.01)
*C08K 9/02* (2006.01)

(52) U.S. Cl.
CPC ............. *C09D 177/00* (2013.01); *H01B 1/22* (2013.01); *H01B 5/14* (2013.01); *H01B 13/0036* (2013.01); *B05D 3/06* (2013.01); *C08K 2003/085* (2013.01); *C08K 7/18* (2013.01); *C08K 9/02* (2013.01); *C08K 2201/001* (2013.01); *C08K 2201/005* (2013.01); *C08K 2201/011* (2013.01)

(58) Field of Classification Search
CPC .......... C09D 201/00; H01B 1/22; H01B 5/14; H01B 13/0036; H01B 1/00; B05D 3/06; B05D 1/26; B05D 1/40; B05D 2505/00; B05D 2601/28; B05D 5/12; C08K 7/18; C08K 9/02; C08K 2003/085; C08K 2201/001; C08K 2201/005; C08K 2201/011; C08K 7/00
See application file for complete search history.

(56) References Cited

U.S. PATENT DOCUMENTS

2017/0209924 A1* 7/2017 Suetsuna ................. B22F 1/056
2020/0035391 A1* 1/2020 Suetsuna ................. H01F 3/08

FOREIGN PATENT DOCUMENTS

| JP | 2003-119501 | 4/2003 |
| JP | 2014-011412 | 1/2014 |
| JP | 2016-196705 | 11/2016 |
| JP | 2017-66269 | 4/2017 |
| JP | 2017-123253 | 7/2017 |
| KR | 10-2014-0131576 | 11/2014 |
| TW | 201405588 | 2/2014 |
| WO | 2014/006933 | 1/2014 |

OTHER PUBLICATIONS

Written Opinion of the ISA for PCT/JP2019/012986 dated Jun. 11, 2019, 4 pages.

* cited by examiner

CONDUCTIVE FILM FORMATION COMPOSITION AND METHOD FOR MANUFACTURING CONDUCTIVE FILM

CROSS-REFERENCE TO RELATED APPLICATIONS

This application is the U.S. national phase of International Application No. PCT/JP2019/012986 filed Mar. 26, 2019 which designated the U.S. and claims priority to Japanese Patent Application No. 2018-061596 filed Mar. 28, 2018, the entire contents of each of which are hereby incorporated by reference.

TECHNICAL FIELD

The present invention relates to a composition for forming a conductive film and a method for manufacturing a conductive film.

BACKGROUND ART

As a technique for forming a conductive pattern made of a conductive film on a substrate, a method is known that includes forming a coating film of a predetermined pattern on a substrate with use of a composition containing conductive particles, such as metal particles, and a resin, and sintering the conductive particles in the coating film to thereby forming a conductive film. A method involving heating and sintering the coating film is commonly used in order to sinter the conductive particles.

For example, Patent Literature 1 discloses a coating material for forming a conductive film, the coating material containing a fine copper powder with an average particle diameter of 10 nm to 100 nm, a coarse copper powder with a volume-based cumulative particle diameter $D_{50}$ of 0.3 μm to 20.0 μm, a copper oxide powder (CuO) with a particle diameter $D_{50}$ of 0.1 μm to 10.0 μm, and a resin. Patent Literature 1 also discloses that a conductive film can be produced by forming the coating material into a coating film, and then photo-sintering the coating film.

CITATION LIST

Patent Literature

Patent Literature 1: JP 2017-66269A

SUMMARY OF INVENTION

However, because the coating material for forming a conductive film disclosed in Patent Literature 1 contains the fine copper powder in a large amount, the extent of volumetric shrinkage of the fine copper powder during photo-sintering is significant, and the conductive film formed has poor smoothness. On the other hand, if the amount of fine copper powder in the coating material for forming a conductive film is reduced, it is difficult to allow sintering of the copper particles to progress smoothly, resulting in an increase in the resistivity of the conductive film.

Therefore, it is an object of the present invention to provide a composition for forming a conductive film that forms a conductive film with excellent smoothness and a low resistivity, and a method for manufacturing the conductive film.

The present invention provides a composition for forming a conductive film, the composition containing flat metal particles and a resin,
  wherein the flat metal particles each have a metal oxide layer in the surface portion thereof,
  the flat metal particles have a ratio of the thickness of the metal oxide layer to the thickness of the flat metal particle of from 0.010 to 0.300, and
  the thickness of the metal oxide layer is from 0.010 μm to 2.000 μm.

Also, the present invention provides a method for manufacturing a conductive film using a composition for forming a conductive film, the composition containing flat metal particles and a resin wherein the flat metal particles each have a metal oxide layer in the surface portion thereof,
  the method including the steps of
  forming a coating film by applying the composition for forming a conductive film to a base material, and
  then sintering the coating film by irradiating the coating film with light, thereby obtaining a conductive film.

DESCRIPTION OF EMBODIMENTS

Hereinafter, the present invention will be described based on preferred embodiments thereof. The composition for forming a conductive film of the present invention contains flat metal particles and a resin.

The flat metal particles contained in the composition for forming a conductive film of the present invention give conductivity to a film made of the composition. The flat metal particles may have conductivity prior to sintering, or may be a substance that undergoes a chemical change to obtain conductivity when sintered.

Examples of the metal particles include particles of gold, silver, copper, nickel, cobalt, zinc, tin, indium, gallium, aluminum, palladium, tantalum, and niobium, and particles of alloys composed of two or more of these metals. Among these, it is preferable to use copper particles as the metal particles in view of the availability and the high conductivity. The flat metal particles may contain incidental impurities as long as the effects of the present invention are not impaired.

Figure 1A:
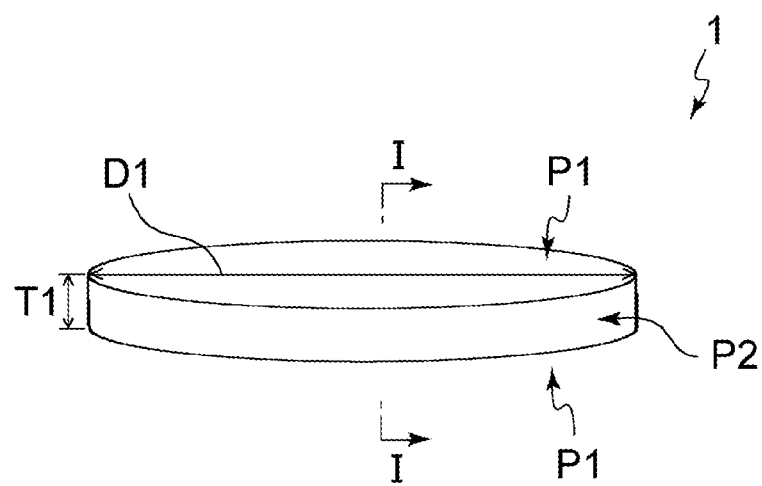
FIG. 1(a) is a schematic perspective view showing a form of the flat metal particle used in the present invention.

As shown in FIG. 1(a), the flat metal particle 1 has the shape of a flat, thin (plate-shaped) piece. The flat metal particle 1 has two platy surfaces P1, which are the main surfaces of the particle, and a side surface P2, which is substantially perpendicular to the platy surfaces P1. The flat metal particle 1 has a length D1 in a width direction of the flat metal particle 1 and a thickness T1 of the flat metal particle. The thickness T1 of the flat metal particle 1 is smaller than the length D1 in the width direction. The platy surfaces P1 and the side surface P2 do not need to be flat surfaces, and may be curved surfaces or uneven surfaces. The platy surfaces P1 when viewed in a plan view do not need to have a circular shape, and may have other shapes including an irregular shape.

In view of obtaining a highly smooth conductive film, the thickness T1 of the flat metal particle is preferably from 0.20 μm to 5.00 μm, and more preferably from 0.30 μm to 3.00

µm. The thickness T1 of the flat metal particle can be measured using, for example, a scanning electron microscope (SEM).

Figure 1B:
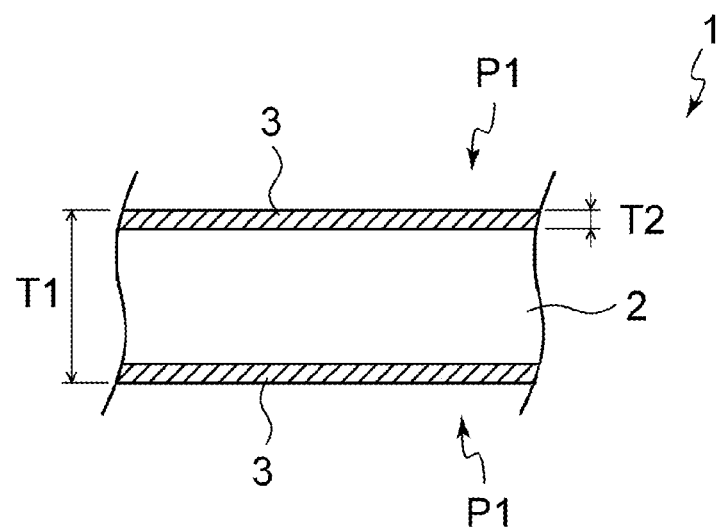
FIG. 1(b) is a cross-sectional view taken along a plane indicated by I-I in FIG. 1(a).

As shown in FIG. 1(b), the flat metal particle 1 has a layer 3 (hereinafter also referred to as the "a metal oxide layers 3") in the surface portion of the particle, the layer 3 being made of an oxide of a metal 2 of the particle. The metal oxide layer 3 makes up at least a part of the surface of the flat metal particle. The metal oxide layer 3 is discontinuously present in the surface portion of the flat metal particle, or continuously and evenly present over the entire region of the surface portion. In the former case, the surface portion of the flat metal particle 1 includes one or more sections formed of the metal 2, which is the base, and one or more sections formed of the metal oxide layer 3. In the latter case, in the surface portion of the flat metal particle 1, the metal oxide layer 3 appears in the entire region of the surface portion without the metal 2 exposed on the surface of the particle. In other words, in the latter case, the flat metal particle 1 includes a core made of the metal 2 and the metal oxide layer 3 present on the core so as to completely cover the core.

The metal oxide layer is made of an oxide of the metal element of the flat metal particle. The metal oxide forming the metal oxide layer depends on the metal element of the flat metal particle. Examples of the metal oxide include gold oxide, silver oxide, copper oxide, nickel oxide, cobalt oxide, zinc oxide, tin oxide, indium oxide, indium tin oxide, gallium oxide, aluminum oxide, palladium oxide, tantalum oxide, and niobium oxide, and mixtures and composite oxides of two or more of these oxides. For example, when flat copper particle is used as the flat metal particle, the metal oxide layer present in the surface portion of the particle is preferably made of copper oxide.

The ratio of the thickness T2 of the metal oxide layer to the thickness T1 of the flat metal particle (see FIG. 1(b)), T2/T1, is preferably from 0.010 to 0.300, more preferably from 0.020 to 0.270, and even more preferably from 0.030 to 0.250, in view of reducing the metal oxide of the metal oxide layer to metallize and also promoting sintering of the flat metal particles, during the photo-sintering, to thereby obtain a low-resistance conductive film.

In the same viewpoint, the thickness T2 of the metal oxide layer is preferably from 0.010 µm to 2.000 µm, more preferably from 0.020 µm to 1.800 µm, and even more preferably from 0.030 µm to 1.500 µm, subject to the fulfillment of the ratio T2/T1 described above. The thickness of the metal oxide layer can be measured using, for example, a method described in Examples, which will be given later. The analysis conditions used in the method can be changed as appropriate, depending on the metal to be analyzed.

The "metal oxide layer" herein is a metal oxide layer intentionally formed by performing oxidation treatment or the like using, for example, a manufacturing method that will be described later, or a method that will be described in Examples. Therefore, a metal oxide layer formed by inevitable oxidation such as natural oxidation is not the "metal oxide layer" herein. More specifically, if flat metal particles have a ratio of the thickness T2 of the metal oxide layer to the thickness T1 of the flat metal particle, T2/T1, of less than 0.010, and a thickness T2 of the metal oxide layer of the flat metal particle of less than 0.010 µm, such a metal oxide layer is defined as a metal oxide layer formed by inevitable oxidation such as natural oxidation.

The inventors of the present invention consider that a highly smooth, low-resistance conductive film can be obtained by using flat metal particles having the above-described metal oxide layer probably for the following reasons (1) and (2).

(1) Due to the shape of the flat metal particles, the flat metal particles do not shrink very much in a platy surface direction of the particles, but shrink mainly in a thickness direction of the particles, during the photo-sintering. As a result, a conductive film is formed that has not shrunk very much in a surface direction but has shrunk mainly in a thickness direction. Thus, the conductive film formed is unlikely to undulate, and a smooth conductive film can be formed.

(2) The flat metal particles according to the present invention each have the metal oxide layer having a specific thickness in the surface portion thereof. In general, a metal oxide has a higher light absorptivity than a metal of the same kind. Therefore, as compared with flat metal particles having no metal oxide layers, the flat metal particles according to the present invention exhibit improved light absorptivity during the photo-sintering because they have the metal oxide layers. The improved light absorptivity causes an increase in the amount of energy to be generated, and accordingly, sintering successfully progresses at the interfaces of the particles. Thus, a low-resistance conductive film can be formed.

In view of obtaining a highly smooth, low-resistance conductive film, the particle diameter of the flat metal particles is preferably from 0.50 µm to 15.00 µm, more preferably from 0.60 µm to 12.50 µm, and even more preferably from 0.80 µm to 12.00 µm, in terms of the volume-based cumulative particle diameter $D_{50}$ at a cumulative volume of 50 vol % as measured by laser diffraction scattering particle size distribution analysis. From the same viewpoint, the particle size distribution curve of the flat metal particles may have a single peak or two or more peaks. The volume-based cumulative particle diameter $D_{50}$ can be measured using, for example, Microtrac MT-3000 manufactured by Nikkiso Co., Ltd. As a pretreatment, a method may be used which includes blending flat metal particles to be measured with a surfactant to prepare a sample, then placing the sample and an aqueous solution containing a dispersing agent in a beaker, and ultrasonically dispersing the sample. More specifically, 0.1 g of a test sample to be measured is mixed with 100 mL of a 20 mg/L aqueous solution of sodium hexametaphosphate and treated for 10 minutes using an ultrasonic homogenizer (US-300T manufactured by Nissei Corporation) to disperse, and then, the volume-based cumulative particle diameter $D_{50}$ is measured using the aforementioned Microtrac MT-3000.

The flat metal particles have a ratio of the length D1 in the width direction to the thickness T1 (see FIG. 1(a)), D1/T1, of preferably from 2.00 to 10.00, more preferably from 2.20 to 8.00, and even more preferably from 2.50 to 5.00. When D1/T1 is within this range, a highly smooth, low-resistance conductive film can be formed.

The ratio of the length D1 in the width direction to the thickness T1 of the particles, D1/T1, can be determined using, for example, an observation image under a scanning electron microscope (SEM). Specifically, first, flat metal particles are added to a dispersion medium such as ethanol and dispersed using an ultrasonic disperser. Then, the dispersion is applied to a predetermined base material and dried to form a coating film. Next, the coating film is fixed using a resin, and the coating film is then cut along a thickness direction thereof. The cut surface is observed under the SEM. The length D1 in the width direction and the thickness T1 are measured for each of 100 arbitrarily selected flat metal particles. For the individual particles, the ratio D1/T1 is calculated from the found values and then, the arithmetic mean of the ratio D1/T1 is calculated, which is taken as the ratio D1/T1 of the flat metal particles. Regarding the definition of the length D1 and the thickness T1, when a particle observed in the cut surface is focused on, the length D1 in the width direction is the maximum length of a planar image (two-dimensional image) of the side surface P2 in the horizontal direction (surface direction), the surface direction being defined as the direction of a plane parallel to the platy surface P1, and the thickness T1 is the maximum length of the planar image in the vertical direction (thickness direction).

As described above, the composition for forming a conductive film contains a resin. In the present invention, the resin is used as a vehicle for dispersing the flat metal particles, and is also used to form a coating film. For these purposes, an organic polymer compound having the ability to form a coating film is favorably used as the resin. Examples of the organic polymer compound include polyamide resins; polyester resins such as polyethylene terephthalate; cellulose-based materials such as ethyl cellulose, methyl cellulose, cellulose acetate butyrate, cellulose acetate, cellulose acetate propionate, hydroxypropyl methylcellulose, hydroxyethyl methylcellulose, hydroxyethyl cellulose, propyl cellulose, nitrocellulose, and ethyl hydroxyethyl cellulose; alkyd resins; various acrylic resins with an acrylic main chain mainly of acrylic acid or methacrylic acid or an ester thereof, such as methacrylic acid ester polymers, acrylic acid ester polymers, acrylic acid ester-methacrylic acid ester copolymers, and butyl methacrylate resins; vinyl-based resins such as polyvinyl alcohol, polyvinyl butyral, and α-methylstyrene polymers; terpene resins and terpene phenolic resins, petroleum-based resins such as aromatic-based petroleum resins, hydrogenated petroleum resins, and cyclopentadiene-based petroleum resins, and polybutadiene-based resins; polyisoprene-based resins; polyether-based resins; and ethylene oxide-based polymers. These resins may be used singly or in a combination of two or more.

The amount of the resin added is preferably from 0.1 parts by mass to 20.0 parts by mass, more preferably from 0.5 parts by mass to 15.0 parts by mass, and even more preferably from 1.0 parts by mass to 10.0 parts by mass, relative to 100 parts by mass of the total amount of metal particles (the flat metal particles, or all the metal particles when the composition for forming a conductive film also contains metal particles other than the flat metal particles; the same applies hereinafter) contained in the composition for forming a conductive film. When the amount of the resin added is within this range, the formation of a coating film of the composition for forming a conductive film and the formation of a conductive film can be performed successfully.

The resin is generally used dissolved in an organic solvent. Example of the organic solvent include ethyl carbitol acetate, terpineol, ethylbenzene, α-terpinene, myrcene, dihydroterpinyl acetate, alone or with dihydroterpineol, butyl carbitol acetate, butyl carbitol, pentanediol, limonene, isobornylphenol, and isobornyl cyclohexanol. These organic solvents may be used singly or in a combination of two or more.

The amount of the organic solvent added is preferably from 1.0 parts by mass to 50.0 parts by mass, more preferably from 3.0 parts by mass to 45.0 parts by mass, and even more preferably from 5.0 parts by mass to 40.0 parts by mass, relative to 100 parts by mass of the total amount of metal particles contained in the composition for forming a conductive film. When the amount of organic solvent added is within this range, the formation of a coating film of the composition for forming a conductive film and the formation of a conductive film can be performed successfully.

Preferably, the composition for forming a conductive film of the present invention further contains metal particles having a smaller diameter than the flat metal particles (hereinafter also referred to as "small-diameter metal particles"), in addition to the flat metal particles. The small-diameter metal particles have small volumes because of the small diameter thereof, and are therefore easy to sinter compared with the flat metal particles. For this reason, when the small-diameter metal particles are contained in the composition for forming a conductive film, the small-diameter metal particles enter between the flat metal particles, and the flat metal particles are sintered via the small-diameter metal particles that are present between the flat metal particles. Thus, a conductive film with even lower resistance can be formed through sintering.

The term "small-diameter" means either of the following: when the volume-based cumulative particle diameters $D_{50}$ of the flat metal particles and the small-diameter metal particles at a cumulative volume of 50 vol % as measured by laser diffraction scattering particle size distribution analysis are compared, the volume-based cumulative particle diameter $D_{50}$ of the small-diameter metal particles is smaller than the volume-based cumulative particle diameter $D_{50}$ of the flat metal particles; or when a coating film is formed of a composition for forming a conductive film containing the flat metal particles and the small-diameter metal particles in the same manner as described above, and is cut along the thickness direction, the length in the width direction (surface direction) of the small-diameter metal particles contained in the coating film is smaller than the length D1 in the width direction (surface direction) of the flat metal particles contained in the coating film in the cut surface observed under an SEM.

As is the case with the flat metal particles, the small-diameter metal particles can give conductivity to a film made of the composition for forming a conductive film. The small-diameter metal particles may have conductivity prior to sintering, or may be a substance that undergoes a chemical change to obtain conductivity when sintered.

Examples of the small-diameter metal particles include particles of gold, silver, copper, nickel, cobalt, zinc, tin, indium, gallium, aluminum, palladium, tantalum, and niobium, and particles of alloys composed of two or more of these metals. As the material for the small-diameter metal particles, a metal of the same kind as, or a different kind from, the metal of the flat metal particles can be used. The small-diameter metal particles may contain incidental impurities as long as the effects of the present invention are not impaired.

In view of increasing the conductivity of the conductive film, it is preferable to use the same kind of metal for the small-diameter metal particles and the flat metal particles, and it is more preferable to use copper particles as both the small-diameter metal particles and the flat metal particles.

The small-diameter metal particles may be, for example, spherical, flat (platy or a flaky), or fibrous. In terms of the shape, the small-diameter metal particles may be a single type, or a combinations of two or more of these shapes. In view of improving the mixing properties and the dispersibility of the small-diameter metal particles in the composition for forming a conductive film, the small-diameter metal particles are preferably spherical. The term "spherical" includes at least one of a perfectly spherical shape and a shape (substantially spherical shape) that is not perfectly spherical but can be recognized as a sphere.

In view of causing the conductive film during the sintering to shrink mainly in the film thickness direction and preventing the small-diameter metal particles from scattering during the photo-sintering to obtain a highly smooth conductive film, and also in view of obtaining a low-resistance conductive film, the amount of small-diameter metal particles is preferably from 1.0 mass % to 20.0 mass %, more preferably from 1.0 mass % to 18.0 mass %, and even more preferably from 1.0 mass % to 15.0 mass % relative to the total mass of the flat metal particles and the small-diameter metal particles.

In view of obtaining a highly smooth, low-resistance conductive film, the particle diameter of the small-diameter metal particles is preferably from 0.05 µm to 0.50 µm, more preferably from 0.06 µm to 0.45 µm, and even more preferably from 0.07 µm to 0.40 µm, in terms of the volume-based cumulative particle diameter $D_{50}$ at a cumulative volume of 50 vol % as measured by laser diffraction scattering particle size distribution analysis. From the same viewpoint, the particle size distribution curve of the small-diameter metal particles may have a single peak or two or more peaks. The volume-based cumulative particle diameter $D_{50}$ of the small-diameter metal particles can be measured using the same analyzer through the same pretreatment as those described for the flat metal particles.

To measure using an SEM the length in the width direction (surface direction) and the thickness of the small-diameter metal particles, or the particle diameter of the small-diameter metal particles in the case where the small-diameter metal particles are spherical, a composition for forming a conductive film containing the flat metal particles and the small-diameter metal particles is formed into a coating film in the same manner as that described above, then the coating film is cut along the thickness direction thereof, and the cut surface is observed under the SEM. Then, measurement is made on 100 arbitrarily selected small-diameter metal particles, and an arithmetic mean of the found values is calculated. Thus, the length and the thickness, or the particle diameter, can be obtained.

The small-diameter metal particles may or may not have a layer made of an oxide of the metal forming the small-diameter metal particles (metal oxide layer) in the surface portion thereof. If the small-diameter metal particle has a metal oxide layer in its surface portion, the metal oxide layer enhances the light absorptivity of the small-diameter metal particles during the photo-sintering, and the amount of energy to be generated increases accordingly. Therefore, the small-diameter metal particles are more likely to scatter, and as a result, a highly smooth conductive film is unlikely to be obtained. For this reason, in view of improving the smoothness of the conductive film even further by preventing scattering of the small-diameter metal particles during the photo-sintering, it is preferable that the small-diameter metal particles have no metal oxide layer in the surface portion thereof. The small-diameter metal particles having no metal oxide layer in the surface portion thereof encompass small-diameter metal particles having a metal oxide layer that is formed by inevitable oxidation such as natural oxidation. More specifically, if small-diameter metal particles have a metal oxide layer and have a ratio of the thickness T3 of the metal oxide layer to the volume-based cumulative particle diameter $D_{50}$, $T3/D_{50}$, of 0.020 or less, and also a thickness T3 of 0.010 µm or less, this metal oxide layer is defined as a metal oxide layer that is formed by inevitable oxidation such as natural oxidation. In other words, "small-diameter metal particles having no metal oxide layer in the surface portion" refers to small-diameter metal particles that have not undergone any intentional oxidation treatment.

In addition to the above-described components, other components may also be contained in the composition for forming a conductive film as necessary. Examples of the other components include a photopolymerization initiator, an ultraviolet absorber, a sensitizer, a sensitization aid, a polymerization inhibitor, a plasticizer, a thickening agent, an antioxidant, a dispersing agent, an antifoaming agent, and an organic or inorganic anti-precipitation agent.

A method for manufacturing the composition for forming a conductive film will now be described. The method for manufacturing the composition for forming a conductive film is divided roughly into the step of forming a metal oxide layer in the surface portion of each of metal particles as a raw material to thereby produce flat metal particles (metal oxide layer-forming step) and the step of preparing a composition for forming a conductive film containing the flat metal particles and a resin (preparation step).

First, a metal oxide layer is formed in the surface portion of each of metal particles as a raw material (metal oxide layer-forming step). For example, the metal oxide layer can be formed by using flat metal particles as a raw material, and subjecting the flat metal particles as a raw material to an oxidation treatment to thereby directly form a metal oxide layer in the surface portion of each of the metal particles or coating the surface of the flat metal particles as a raw material with a metal oxide to thereby form a layer of the metal oxide.

Alternatively, in this step, flat metal particles each having a metal oxide layer can also be formed by forming a metal oxide layer on the surface of spherical metal particles as a raw material through an oxidation treatment or a coating treatment, and pressing the resulting particles into flat shapes. In view of improving the production efficiency of the metal oxide layer, it is preferable to subject flat metal particles as a raw material to an oxidation treatment to thereby directly form a metal oxide layer in the surface portion of each of the particles.

Regarding the treatment conditions of the oxidation treatment for this step, heating may be performed under the following conditions, for example. Heating may be performed in an air atmosphere, and the heating temperature may be preferably from 50° C. to 300° C., and more preferably from 60° C. to 250° C. The heating time may be preferably from 0.05 hours to 24 hours, and more preferably from 0.1 hours to 12 hours. Under these conditions, flat metal particles each having a metal oxide layer with a thickness within a specific range can be efficiently produced, the metal oxide layer being continuously and evenly present over the entire region of the surface of the metal particle as the raw material. In this case, the kind of the metal that forms the metal oxide layer is the same as the kind of the metal of the metal particles as the raw material.

When the flat metal particles each having a metal oxide layer is to be produced using spherical metal particles as a raw material, the pressure when pressed may be preferably from 5 MPa to 700 MPa, and more preferably from 35 MPa to 600 MPa. Pressing at a pressure within this range can be performed using an apparatus such as, for example, a reciprocal press or a roll press.

Next, a composition for forming a conductive film containing the flat metal particles and a resin are prepared (preparation step). In addition to the flat metal particles and the resin, the composition for forming a conductive film prepared in this step may contain an organic solvent, small-diameter metal particles, and other components as necessary.

A described above, the composition for forming a conductive film can be prepared by mixing the flat metal particles and the resin, and an organic solvent, small-diameter metal particles, and others as necessary. As a mixing apparatus for mixing, a roll kneader, a deaeration kneader, a mixer, or the like can be used, for example. In general, the thus prepared composition for forming a conductive film is used in the form of, for example, paste or ink, which has fluidity.

If a metal oxide layer is to be formed in the surface portion of the small-diameter metal particle, small-diameter metal particles as a raw material may be subjected to an oxidation treatment prior to the preparation step. Regarding the conditions (atmosphere, heating temperature, and heating time) of the oxidation treatment, the oxidation treatment may be performed at a temperature of 60° C. to 250° C., inclusive, for 0.1 hours to 15 hours, inclusive, in the air, for example.

Next, a method for manufacturing a conductive film of the present invention will be described below. The method for manufacturing a conductive film of the present invention is divided roughly into the step of forming a coating film by applying a composition for forming a conductive film containing flat metal particles and a resin to a base material (coating film-forming step) and the step of sintering the coating film by irradiating the coating film with light (photo-sintering step). The flat metal particles and the small-diameter metal particles will also be collectively referred to simply as the "metal particles" hereinafter.

First, a coating film is formed by applying a composition for forming a conductive film containing flat metal particles and a resin to a base material (coating film-forming step). The composition for forming a conductive film prepared in this step may contain an organic solvent as necessary. In general, the composition for forming a conductive film is used in the form of, for example, paste or ink, which has fluidity, and is therefore capable of being applied to the base material.

As the method for forming the coating film, an appropriate method is employed according to the characteristics of the composition, the pattern of the coating film, and the like. Examples of the method for forming the coating film include screen printing, photogravure printing, inkjet printing, transfer printing, laser printing, xerography printing, pad printing, spin coating, casting, dip coating, spray coating, and dispensing.

Examples of the base material to which the composition for forming a conductive film is applied include various synthetic resin films, glass epoxy substrates, phenolic resin substrates, liquid crystal polymers, green sheets, ceramics, glass plates, and paper. Examples of the synthetic resin include polyimide, polyethylene terephthalate (PET), polyethylene naphthalate, and a cycloolefin polymer.

After the coating film of the composition has been formed on one face of the base material, it is preferable to pre-dry the coating film. The coating film can be pre-dried in the air or in an inert gas atmosphere, for example. The drying conditions depend on the components of the coating film and the heat resistance of the base material, but the pre-drying temperature is generally preferably from 50° C. to 250° C., more preferably from 60° C. to 230° C., and even more preferably from 70° C. to 200° C. The shape retention properties of the coating film can be improved by pre-drying within this temperature range. Thus, during the compression step, which is the next step, the coating film is unlikely to spread in the width direction and is compressed mainly in the thickness direction, and therefore, a good-quality conductive film can be obtained. The pre-drying time is preferably from 0.1 hours to 5 hours, and more preferably from 0.2 hours to 3 hours, when the pre-drying temperature is within the above-described range.

It is preferable to further perform the step of compressing the coating film in the thickness direction after the pre-drying of the coating film has been performed in the above-described manner. The film density is increased by compressing the coating film. Consequently, in the photo-sintering step, which will be described later, excessive movement of the metal particles is suppressed, and the metal particles are therefore effectively prevented from scattering from the coating film. Thus, a good-quality conductive film can be obtained.

In view of even more effectively suppressing scattering of the metal particles from the coating film during the photo-sintering step, the degree of compression of the coating film, in terms of the compression rate in the thickness direction, is preferably from 25% to 80%, more preferably from 30% to 70%, and even more preferably from 30% to 60%. The compression rate (%) is calculated from {(thickness of coating film before compression−thickness of coating film after compression)/thickness of coating film before compression}×100. The thickness of the coating film before compression means the thickness of the coating film immediately before the compression, and in the case where the above-described pre-drying is preformed, the thickness of the coating film before compression means the thickness of the coating film after the pre-drying and immediately before the compression. The thickness of the coating film is measured using a micrometer, a pair of vernier calipers, or the like.

As the means for compressing the coating film, an appropriate means is used according to the type of the base material. For example, a reciprocal press, a roll press, or the like can be used. During the compression, the pressure can be controlled so that the compression rate of the coating film is within the above-described range, and the pressure is generally preferably from 5 MPa to 700 MPa, more preferably from 35 MPa to 600 MPa, and even more preferably from 70 MPa to 430 MPa.

Compression of the coating film is preferably performed at a temperature at which the resin contained in the composition forming the coating film has a storage modulus of 100 MPa or less. When compression of the coating film is performed under such temperature conditions, the resin flows moderately, and therefore the voids present in the coating film can be filled even further. As a result, in the photo-sintering step, excessive movement of the metal particles contained in the coating film is suppressed even further. Accordingly, the metal particles are effectively prevented from scattering from the coating film, and additionally, the sinterability of the metal particles improves. These enable further reduction in the resistance of the conductive film to be obtained. From this viewpoint, the storage modulus of the resin in the coating film during the compression is more preferably 80 MPa or less, and even more preferably 70 MPa or less. The lower limit of the storage modulus of the resin during the compression of the coating film is generally preferably, but not limited to, about 5 MPa, and particularly preferably about 10 MPa.

When the resin has a storage modulus of 100 MPa or less at room temperature, compression of the coating film can be performed at room temperature. If the resin has a storage modulus of greater than 100 MPa at room temperature, compression of the coating film is preferably performed in a state in which the coating film is heated to a temperature at which the resin has a storage modulus of 100 MPa or less. The storage modulus of the resin can be determined by performing dynamic mechanical analysis (DMA). If the resin has a storage modulus of greater than 100 MPa at room temperature, the temperature at which the resin has a storage modulus of 100 MPa or less can be determined by measuring the storage modulus of the resin while increasing the temperature of the resin.

Finally, the coating film is sintered by irradiating the coating film with light (photo-sintering step). In the photo-sintering step, the coating film is irradiated with light of a predetermined wavelength. The light irradiation is preferably irradiation with pulsed light, because the temperature can be easily controlled. "Pulsed light" refers to light with short irradiation period, and in the case where light irradiation is repeated multiple times, "pulsed light" means a mode of light irradiation that has a period of no light irradiation between a first light irradiation period and a second light irradiation period. The intensity of light may change during a single light irradiation period.

The pulse width of the pulsed light is preferably from 5 μs to 1 s, and more preferably from 20 μs to 10 ms. The irradiation with pulsed light may be performed once, or may be repeated multiple times. In the case where the irradiation is repeated multiple times, the interval between irradiations is preferably from 10 μs to 30 s, and more preferably from 20 μs to 10 s.

As the light source for use in the photo-sintering step, a light source is used which emits light of a wavelength the flat metal particles can absorb when irradiated with light. For example, a known light source such as a xenon flash lamp can be used. Xenon light has a spectrum that covers wavelengths from 200 nm to 800 nm. In the case where a xenon flash lamp is used, optimal conditions can be set with the pulse width within a range from 5 μs to 1 s and the pulse voltage within a range from 1600 V to 3800 V.

The conductive film that has been formed through photo-sintering may be further subjected to a downstream step as necessary. An example of the downstream step is compression processing. In the photo-sintered conductive film, there are many voids as a result of volatilization of the organic solvent or the like contained in the coating film. If the conductive film is compressed so that the voids are reduced, the conductivity improves. Moreover, the compression processing of the conductive film has another advantage of improving the adhesion between the conductive film and the base material. A roll press, for example, can be used to compress the conductive film.

The thus obtained conductive film has high smoothness and also has low resistance due to the densely sintered metal particles. Therefore, the conductive film can be favorably used as various electric or electronic circuits. Alternatively, the conductive film can also be used as RFID tags and antennas, and the like.

EXAMPLES

Hereinafter, the present invention will be described in greater detail by way of examples. However, the scope of the present invention is not limited to the following examples. Unless otherwise specified, "part" means "part by mass".

Example 1

As metal particles as a raw material, plate-shaped copper particles (the volume-based cumulative particle diameter $D_{50}$=3.90 μm, the ratio of the length D1 in the width direction to the thickness T1 of the particles=3.54, the thickness T1 of the particles=1.27 μm; manufactured by Mitsui Mining & Smelting Co., Ltd.) were used. The plate-shaped copper particles were subjected to an oxidation treatment at 200° C. for 18 hours in the air to oxidize the surface of the particles. Thus, flat copper particles in each of which a copper oxide layer was formed on the surface of a plate-shaped copper particle were produced. The flat copper particles had a ratio of the thickness T2 (μm) of the copper oxide layer to the thickness T1 (μm) of the flat copper particle, T2/T1, of 0.230.

Next, 90.0 parts of the flat copper particles, 10.0 parts of spherical small-diameter copper particles (the volume-based cumulative particle diameter $D_{50}$=0.20 μm, the particle diameter measured by observation under an SEM=0.20 μm; manufactured by Mitsui Mining & Smelting Co., Ltd.) as small-diameter metal particles, 4 parts of polyamide resin (TPAE-826-5A manufactured by T&K TOKA Co., Ltd.) as a resin, and 17.5 parts of terpineol and 7.5 parts of limonene as organic solvents were kneaded using a three-roll kneader to obtain a composition for forming a conductive film in a paste form. The small-diameter copper particles were not subjected to an oxidation treatment, and the small-diameter copper particles had a ratio of the thickness T3 (μm) of the copper oxide layer thereof to the volume-based cumulative particle diameter $D_{50}$ (μm) thereof, T3/$D_{50}$, of 0.005.

The obtained composition for forming a conductive film was applied to one face of a polyethylene terephthalate (PET) film serving as a base material and having a thickness of 100 μm through screen printing, to form a coating film with a thickness of 50 μm. The coating film had a size of 1 cm square. This coating film was pre-dried at 110° C. for 30 minutes in the air, and then the coating film was cooled to 25° C. Then, a release film was placed on the surface of the coating film to protect the coating film, followed by compression at the same temperature and a pressure of 215 MPa in the air. The compression was performed using a hydraulic press. After that, the coating film was subjected to the photo-sintering step. The photo-sintering was performed using a xenon flash lamp. The pulse width was 1.25 ms, and the pulse voltage was 2500 V to 3000 V. A release film was placed on the surface of the thus obtained conductive film to protect the conductive film, followed by compression at a pressure of 215 MPa using a hydraulic press as post-treatment. Thus, a conductive film of Example 1 was produced.

Example 2

A composition for forming a conductive film and a conductive film were produced in the same manner as in Example 1, except that the conditions of the oxidation treatment of the plate-shaped copper particles were changed to 160° C. for 1 hour in the air. The flat copper particles obtained in this example had a ratio of the thickness T2 (μm) of the copper oxide layer to the thickness T1 (μm) of the particle, T2/T1, of 0.150.

Example 3

A composition for forming a conductive film and a conductive film were produced in the same manner as in Example 1, except that the conditions of the oxidation treatment of the plate-shaped copper particles were changed to 160° C. for 15 minutes in the air. The flat copper particles obtained in this example had a ratio of the thickness T2 (μm) of the copper oxide layer to the thickness T1 (μm) of the particle, T2/T1, of 0.030.

Example 4

A composition for forming a conductive film and a conductive film were produced in the same manner as in Example 2, except that the amount of the flat copper particles was changed to 99.0 parts, and that the amount of the spherical small-diameter copper particles used was changed to 1.0 part.

Example 5

A composition for forming a conductive film and a conductive film were produced in the same manner as in Example 2, except that the amount of the flat copper particles was changed to 95.0 parts, and that the amount of the spherical small-diameter copper particles used was changed to 5.0 parts.

Example 6

A composition for forming a conductive film and a conductive film were produced in the same similar manner as in Example 2, except that the amount of the flat copper particles was changed to 80.0 parts, and that the amount of the spherical small-diameter copper particles used was changed to 20.0 parts.

Example 7

As metal particles as a raw material, plate-shaped copper particles (the volume-based cumulative particle diameter $D_{50}$=0.89 μm, the ratio of the length D1 in the width direction to the thickness T1 of the particles=2.58, the thickness T1 of the particles=0.42 μm; manufactured by Mitsui Mining & Smelting Co., Ltd.) were used. The plate-shaped copper particles were subjected to an oxidation treatment at 160° C. for 30 minutes in the air to oxidize the surface of the particles. Thus, flat copper particles in each of which a copper oxide layer was formed on the surface of a plate-shaped copper particle were produced. A conductive film was produced in the same manner as in Example 1, except that 100 parts of the flat copper particles was used with no small-diameter copper particles (0 parts). The flat copper particles had a ratio of the thickness T2 (μm) of the copper oxide layer to the thickness T1 (μm) of the flat copper particle, T2/T1, of 0.180.

Example 8

A composition for forming a conductive film and a conductive film were produced in the same manner as in Example 4, except that the spherical small-diameter copper particles used in Example 4 were subjected to an oxidation treatment at 110° C. for 30 minutes in the air. In other words, spherical small-diameter copper particles that had been subjected to an oxidation treatment were used as the small-diameter copper particles. The small-diameter copper particles had a ratio of the thickness T3 (μm) of the copper oxide layer thereof to the volume-based cumulative particle diameter $D_{50}$ (μm) thereof, $T3/D_{50}$, of 0.040.

Example 9

A composition for forming a conductive film and a conductive film were produced in the same manner as in Example 2, except that paper was used as the base material.

Comparative Example 1

A composition for forming a conductive film and a conductive film were produced in the same manner as in Example 1, except that the plate-shaped copper particles of Example 1 were not subjected to an oxidation treatment. In other words, plate-shaped copper particles that had not been subjected to an oxidation treatment were used as the flat copper particles. The flat copper particles had a ratio of the thickness (μm) of the copper oxide layer to the thickness (μm) of the flat copper particle, T2/T1, of 0.005.

Comparative Example 2

A composition for forming a conductive film and a conductive film were produced in the same manner as in Example 1, except that the conditions of the oxidation treatment of the plate-shaped copper particles were changed to 160° C. for 18 hours in the air. The flat copper particles had a ratio of the thickness (μm) of the copper oxide layer to the thickness (μm) of the flat copper particle, T2/T1, of 0.500.

Comparative Example 3

A composition for forming a conductive film and a conductive film were produced in the same manner as in Example 1, except that the plate-shaped copper particles were not subjected to an oxidation treatment, and that the spherical small-diameter copper particles in Example 1 were subjected to an oxidation treatment at 110° C. for 30 minutes in the air and then used. The flat copper particles had a ratio of the thickness T2 (μm) of the copper oxide layer to the thickness T1 (μm) of the flat copper particle, T2/T1, of 0.005. The small-diameter copper particles had a ratio of the thickness T3 (μm) of the copper oxide layer thereof to the volume-based cumulative particle diameter $D_{50}$ (μm) thereof, $T3/D_{50}$, of 0.040.

Measurement of Thickness of Metal Oxide Layer

The thickness of the metal oxide layer was measured by performing X-ray photoelectron spectroscopy measurement (XPS measurement) while sputtering, with use of an X-ray photoelectron spectrometer (VersaProbe III manufactured by ULVAC-PHI, Inc.). Details of the measurement method are described below.

First, metal particles to be subjected to the measurement were dispersed onto a piece of carbon tape. After that, an excess of the particles was removed using a blower, and thus, a measurement sample was obtained. The measurement sample was analyzed under the following analysis conditions using the X-ray photoelectron spectrometer to obtain peaks.

Analysis Conditions
  Excitation X-rays: Monochromatized AlKα radiation (1486.7 eV)
  Output: 50 W
  Diameter of X-ray beam: 200 μm
  Measurement area: 200 μm×1 mm
  Pass Energy: 26 eV
  Energy step size: 0.1 eV
  Take of Angle: 45°

Charge neutralization: Low-speed ions and electrons were used.
Ion species used in depth profile analysis: monomer Ar ions
Acceleration voltage for monomer Ar ion: 2 kV
Sputtering area: 2 mm×2 mm following manner. Specifically, the volume resistivity of a conductive film was measured three times using a resistivity meter (Loresta-GP MCP-T610 manufactured by Mitsubishi Chemical Analytech Co., Ltd.), and the average value of the three found values was used as the volume resistivity (Ω·cm) of that conductive film. Table 1 below shows the results.

TABLE 1

| | Flat metal particles | | | | Small-diameter metal particles | | | Amount [part by mass] | | | Evaluation | |
| --- | --- | --- | --- | --- | --- | --- | --- | --- | --- | --- | --- | --- |
| | | Metal oxide layer | Metal oxide layer thickness [μm] | | | Metal oxide layer | Metal oxide layer thickness [μm] | | | | | Volume |
| | Oxidation treatment | thickness [μm]/Particle thickness [μm] | | Particle thickness [μm] | Oxidation treatment | thickness [μm]/Particle diameter [μm] | | Flat metal particles | Small-diameter metal particles | Base material | Smoothness | resistivity [Ω·cm] |
| Ex. 1 | Yes | 0.230 | 0.289 | 1.27 | No | 0.005 | 0.001 | 90.0 | 10.0 | PET | A | $3 \times 10^{-4}$ |
| Ex. 2 | Yes | 0.150 | 0.193 | 1.27 | No | 0.005 | 0.001 | 90.0 | 10.0 | PET | A | $1 \times 10^{-4}$ |
| Ex. 3 | Yes | 0.030 | 0.038 | 1.27 | No | 0.005 | 0.001 | 90.0 | 10.0 | PET | A | $3 \times 10^{-4}$ |
| Ex. 4 | Yes | 0.150 | 0.193 | 1.27 | No | 0.005 | 0.001 | 99.0 | 1.0 | PET | A | $3 \times 10^{-4}$ |
| Ex. 5 | Yes | 0.150 | 0.193 | 1.27 | No | 0.005 | 0.001 | 95.0 | 5.0 | PET | A | $1 \times 10^{-4}$ |
| Ex. 6 | Yes | 0.150 | 0.193 | 1.27 | No | 0.005 | 0.001 | 80.0 | 20.0 | PET | B | $2 \times 10^{-4}$ |
| Ex. 7 | Yes | 0.180 | 0.077 | 0.42 | — | — | — | 100 | 0 | PET | A | $7 \times 10^{-4}$ |
| Ex. 8 | Yes | 0.150 | 0.193 | 1.27 | Yes | 0.040 | 0.008 | 99.0 | 1.0 | PET | B | $5 \times 10^{-4}$ |
| Ex. 9 | Yes | 0.150 | 0.193 | 1.27 | No | 0.005 | 0.001 | 90.0 | 10.0 | Paper | A | $1 \times 10^{-4}$ |
| Com. Ex. 1 | No | 0.005 | 0.006 | 1.27 | No | 0.005 | 0.001 | 90.0 | 10.0 | PET | A | (Insulated) |
| Com. Ex. 2 | Yes | 0.500 | 0.633 | 1.27 | No | 0.005 | 0.001 | 90.0 | 10.0 | PET | C | $1 \times 10^{-3}$ |
| Com. Ex. 3 | No | 0.005 | 0.006 | 1.27 | Yes | 0.040 | 0.008 | 90.0 | 10.0 | PET | C | $3 \times 10^{-4}$ |

Sputtering rate: 8.0 nm/min in terms of $SiO_2$

The obtained peaks were analyzed in the following manner using a piece of analysis software (MultiPack 9.0 manufactured by ULVAC-PHI, Inc.), and the thickness of the metal oxide layers was calculated.

Analysis Conditions

Waveform separation of LMM peaks was performed using the "Target Factor Analysis" tool of the analysis software to analyze the main component. More specifically, in the case where the metal particles were copper particles, waveform separation of a peak (Cu 2p LMM peak) appearing between 560.0 eV and 590.0 eV, inclusive, was performed. The background mode used was Shirley. Charge correction was performed by setting the Cu 2p binding energy to 932.7 eV.

After that, the thickness (μm) of the metal oxide layers was calculated using the analysis data on the main component. More specifically, the length from the outermost surface of the metal particles to the position at which the ratio of the amount of metal oxide to the total component amount of the metal oxide and the metal was 0.5 was defined as the thickness (μm) of the metal oxide layers. This definition was in accordance with JIS K 0146.

Evaluation of Smoothness

The state of the conductive films obtained in Examples and Comparative Examples was visually observed and evaluated using the following criteria. Table 1 below shows the results.

A: The surface is uniform.

B: The surface is partially rough or in an undulating state.

C: The surface is entirely rough or in an undulating state.

Evaluation of Volume Resistivity

The volume resistivity of the conductive films obtained in Examples and Comparative Examples was measured in the As shown in Table 1, it can be seen that the conductive films of Examples, which were produced using the flat metal particles having the metal oxide layers, had both higher smoothness and a lower volume resistivity than the conductive films of Comparative Examples. In particular, it can be seen that, in Examples 1 to 5, in which the flat metal particles having the metal oxide layer and the small-diameter metal particles having no metal oxide layer were used, conductive films with even higher smoothness and an even lower volume resistivity were produced.

INDUSTRIAL APPLICABILITY

According to the present invention, a composition for forming a conductive film suitable for forming a conductive film with excellent smoothness and a low resistivity is provided.

Also, according to the present invention, a conductive film with excellent smoothness and a low resistivity can be formed through photo-sintering.

The invention claimed is:

1. A composition for forming a conductive film, comprising flat metal particles and a resin,
  wherein the flat metal particles each have a metal oxide layer in a surface portion thereof,
  the flat metal particles have a ratio of a thickness of the metal oxide layer to a thickness of the flat metal particle of from 0.010 to 0.300, and
  the thickness of the metal oxide layer is from 0.010 μm to 2.000 μm;
  the composition further comprising small-diameter metal particles having a smaller diameter than the flat metal particles; and
  wherein the flat metal particles and the small-diameter metal particles are copper particles.

2. The composition for forming a conductive film according to claim 1, wherein the thickness of the flat metal particles is from 0.20 μm to 5.00 μm.

3. The composition for forming a conductive film according to claim 2, wherein a particle diameter of the flat metal particles is from 0.50 μm to 15.00 μm of expressed as a volume-based cumulative particle diameter $D_{50}$ at a cumulative volume of 50 vol % as measured by laser diffraction scattering particle size distribution analysis.

4. The composition for forming a conductive film according to claim 2, wherein the flat metal particles have a ratio of a length thereof in a width direction to the thickness thereof of from 2.00 to 10.00.

5. The composition for forming a conductive film according to claim 1, wherein a particle diameter of the flat metal particles is from 0.50 μm to 15.00 μm expressed as a volume-based cumulative particle diameter $D_{50}$ at a cumulative volume of 50 vol % as measured by laser diffraction scattering particle size distribution analysis.

6. The composition for forming a conductive film according to claim 5, wherein the flat metal particles have a ratio of a length thereof in a width direction to the thickness thereof of from 2.00 to 10.00.

7. The composition for forming a conductive film according to claim 1, wherein the flat metal particles have a ratio of a length thereof in a width direction to the thickness thereof of from 2.00 to 10.00.

8. The composition for forming a conductive film according to claim 1, wherein an amount of the small-diameter metal particles is from 1.0 mass % to 20.0 mass % relative to a total mass of the flat metal particles and the small-diameter metal particles.

9. The composition for forming a conductive film according to claim 6, wherein a particle diameter of the small-diameter metal particles is from 0.05 μm to 0.50 μm expressed as a volume-based cumulative particle diameter $D_{50}$ at a cumulative volume of 50 vol % as measured by laser diffraction scattering particle size distribution analysis.

10. The composition for forming a conductive film according to claim 8, wherein the small-diameter metal particles are spherical.

11. The composition for forming a conductive film according to claim 1, wherein a particle diameter of the small-diameter metal particles is from 0.05 μm to 0.50 μm expressed as a volume-based cumulative particle diameter $D_{50}$ at a cumulative volume of 50 vol % as measured by laser diffraction scattering particle size distribution analysis.

12. The composition for forming a conductive film according to claim 11, wherein the small-diameter metal particles are spherical.

13. The composition for forming a conductive film according to claim 1, wherein the small-diameter metal particles are spherical.

14. The composition for forming a conductive film according to claim 1, wherein the small-diameter metal particles do not have a metal oxide layer in a surface portion thereof.

* * * * *